US006820348B2

(12) United States Patent
Brumbaugh (10) Patent No.: US 6,820,348 B2
(45) Date of Patent: Nov. 23, 2004

(54) MOUNTING TOOL FOR LINEAR ENCODERS (75) Inventor: Michael Brumbaugh, Jamestown, NY (US)

(73) Assignee: Acu-Rite, Inc., Jamestown, NY (US)

( * ) Notice: Subject to any disclaimer, the term of this patent is extended or adjusted under 35 U.S.C. 154(b) by 0 days.

(21) Appl. No.: 09/780,986

(22) Filed: Feb. 9, 2001

(65) Prior Publication Data

US 2002/0112360 A1 Aug. 22, 2002

(51) Int. Cl.⁷ .............................................. G01D 21/00
(52) U.S. Cl. ............................. 33/613; 33/645; 33/706
(58) Field of Search .......................... 33/613, 706, 707, 33/710, 626, 644, 645, 655, 652, 566, 194

(56) References Cited

U.S. PATENT DOCUMENTS

| | | | |
|---|---|---|---|
| 3,526,947 A | * | 9/1970 | Pasek ........................ 408/72 B |
| 3,942,895 A | * | 3/1976 | Meyer et al. ................. 33/707 |
| 4,015,339 A | * | 4/1977 | Horvallius ................... 33/288 |
| 4,070,759 A | | 1/1978 | Nelle |
| 4,160,328 A | | 7/1979 | Ernst |
| 4,170,826 A | | 10/1979 | Holstein |
| 4,273,447 A | | 6/1981 | Nelle |
| 4,320,578 A | | 3/1982 | Ernst |
| 4,413,416 A | | 11/1983 | Ernst |
| 4,429,466 A | * | 2/1984 | Leonard ...................... 33/371 |
| 4,479,304 A | | 10/1984 | Nelle |
| 4,509,262 A | | 4/1985 | Nelle |
| 4,530,157 A | | 7/1985 | Nelle |
| 4,534,113 A | | 8/1985 | Holstein |
| 4,549,354 A | | 10/1985 | Affa et al. |
| 4,554,741 A | | 11/1985 | Affa |
| 4,559,707 A | | 12/1985 | Oberhans |
| 4,586,760 A | | 5/1986 | Welker |
| 4,593,471 A | | 6/1986 | Nelle |
| 4,936,023 A | * | 6/1990 | Pechak ........................ 33/613 |
| 4,947,616 A | * | 8/1990 | Sorton ........................ 33/613 |
| 5,343,628 A | * | 9/1994 | Ham ........................... 33/288 |
| 5,367,783 A | * | 11/1994 | Nygren ........................ 33/613 |
| 5,509,213 A | * | 4/1996 | Kelly et al. ................... 33/451 |
| 5,611,148 A | | 3/1997 | Affa |
| 5,655,311 A | | 8/1997 | Affa |
| 5,775,036 A | * | 7/1998 | Stanley, Sr. ................ 52/127.2 |
| 5,867,917 A | * | 2/1999 | Karon ......................... 33/613 |
| 5,937,531 A | * | 8/1999 | Menk et al. .................. 33/533 |
| 5,940,979 A | * | 8/1999 | Ericksen et al. .............. 33/667 |
| 6,077,000 A | * | 6/2000 | Gibbons et al. .............. 33/529 |
| 6,092,296 A | | 7/2000 | Nelle |
| 6,119,357 A | * | 9/2000 | Ochiai et al. .......... 324/207.21 |
| 6,260,285 B1 | * | 7/2001 | Schnetzler et al. ........... 33/645 |

OTHER PUBLICATIONS

ACU–RITE Incorporated, ENC 150 Reference Manual Aug. 1998, Edition D, pp. 1–19.*
"Acu-Rite—ENC 150 Mounting Instructions," Published by Acu-Rite of Jamestown, New York, Aug. 1998, pp. 1–7.

* cited by examiner

Primary Examiner—Christopher W. Fulton
Assistant Examiner—Amy R Cohen
(74) Attorney, Agent, or Firm—Brinks Hofer Gilson & Lione (57) ABSTRACT A mounting tool that includes a base extending along a first direction that is parallel to a longitudinal dimension of the base and a height gage attached to the base. The height gage includes a first leg attached to the base and extending along a second direction that is not parallel to the first direction and a second leg attached to the first leg and comprising a support portion extending along a third direction that is not parallel to the second direction.

19 Claims, 5 Drawing Sheets

MOUNTING TOOL FOR LINEAR ENCODERS

BACKGROUND OF THE INVENTION

1. Field of the Invention

The present invention relates to a mounting tool for attaching a measuring device to a machine tool. In particular, the present invention regards a mounting tool for attaching a linear encoder to a machine tool.

2. Discussion of Related Art

It is well known to retrofit one or more axes of existing, manually operated machine tools with linear encoders. The linear encoders generate position dependent output signals so that the machine tools can be operated as numerically controlled machines.

Figures 1, 2, 3, 4, 5:
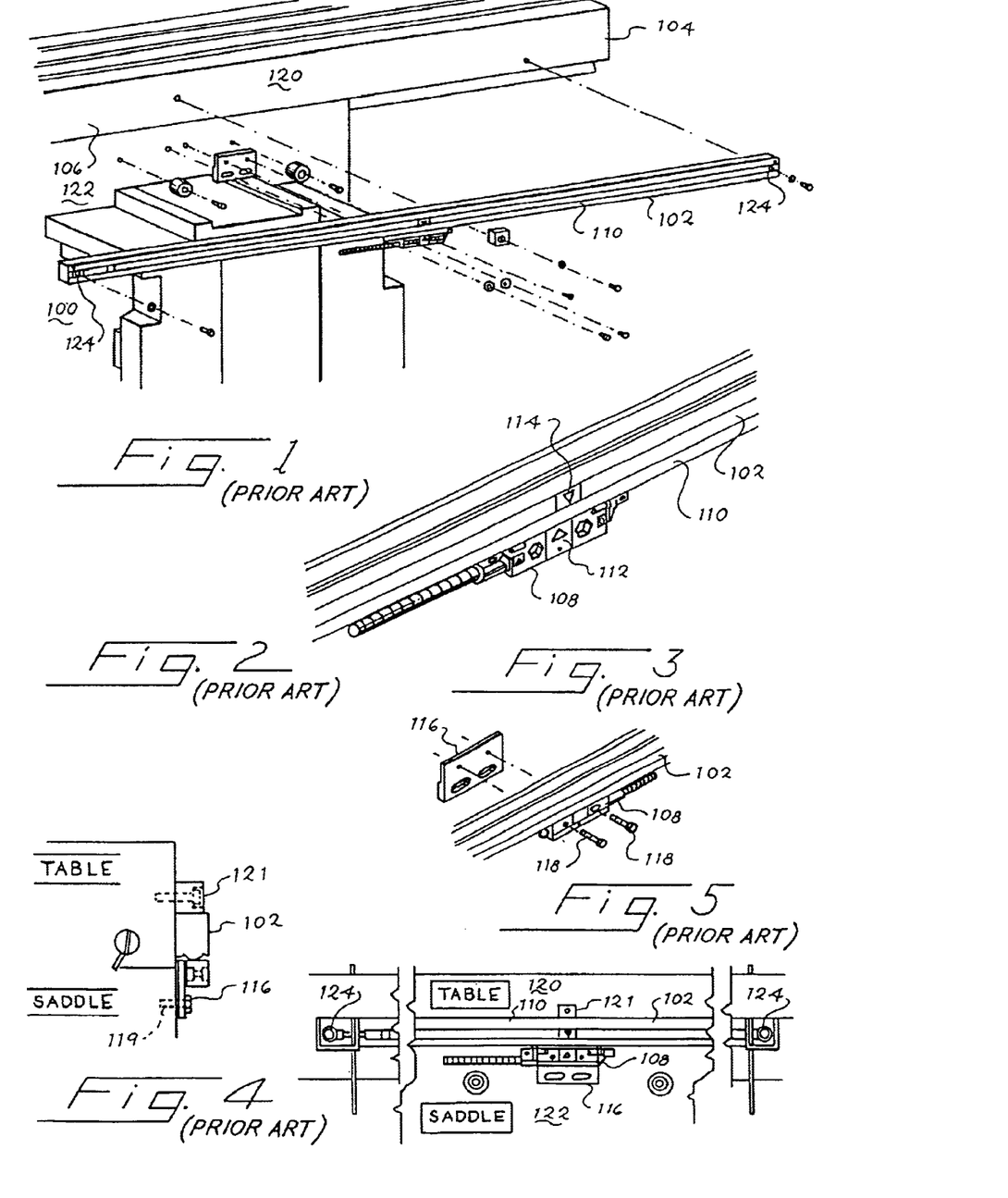
FIG. 1 shows an exploded view of a linear encoder attached to the longitudinal axis of a machine tool via a known process.
FIG. 2 shows a perspective view of a linear encoder being aligned in accordance with the known process of FIG. 1.
FIG. 3 shows a perspective view of a bracket being attached to a reading head in accordance with the known process of FIG. 1.
FIG. 4 shows a side cross-sectional view of a linear encoder supported for marking in accordance with the known process of FIG. 1.
FIG. 5 shows a front view of the linear encoder of FIG. 4.

An example of a system for retrofitting manually operated machine tools with linear encoders is the bracket kit sold by Acu-Rite of Jamestown, N.Y. under Model No. 385072-17. As shown in FIG. 1, the system 100 includes a linear encoder 102 for attachment to the longitudinal axis 104 of the machine tool 106. As shown in FIG. 2, a reading head 108 is placed adjacent to the bottom of the scale case 110 that contains the linear encoder 102. The reading head 108 is moved so that an alignment mark 112 is aligned with an alignment mark 114 positioned on the scale case 110. Once alignment is achieved, a reading head bracket 116 is attached to the reading head 108 via screws 118 as shown in FIG. 3.

Once the reading head bracket 116 is attached to the reading head 108, the table 120 of the machine tool 106 is positioned at its center of travel. In addition, the linear encoder 102 is centered against the table 120 and the reading head bracket 116 is centered against the saddle 122 of the machine tool 106 as shown in FIGS. 4 and 5.

At this stage, one of the mounting holes 124 of the linear encoder 102 is marked to the back side of the table 120 as shown in FIG. 5. The linear encoder 102 is removed and a hole is drilled at the marked location. After the hole has been drilled, one end of the linear encoder 102 is attached to the table 120 by inserting a screw into both a mounting hole 124 and the drilled hole. The linear encoder 102 is realigned and the other mounting hole 124 is marked. Again, the linear encoder 102 is moved and a hole is drilled at the marked location. The linear encoder 102 is realigned and a screw is inserted through the other mounting hole and the recently drilled hole resulting in the attachment of the linear encoder 102 to the table 120.

At this stage, a center support 121 is attached to the table 120. This attachment is accomplished by placing the center support 121 on top of the scale case 138 at the center of the linear encoder 102. After the scale case 138 is centered, the location of the center support 121 is marked via a transfer punch. The center support 121 is removed and the scale case 138 is covered so that the marked location of the center support is drilled to form a hole. The center support 121 is then replaced and a screw is inserted into the center support 121 and the drilled hole to attach the center support to the table as shown in FIGS. 4 and 5. At this stage, the reading bracket is attached to the saddle 122 via screws 119.

Figures 6, 7, 8:
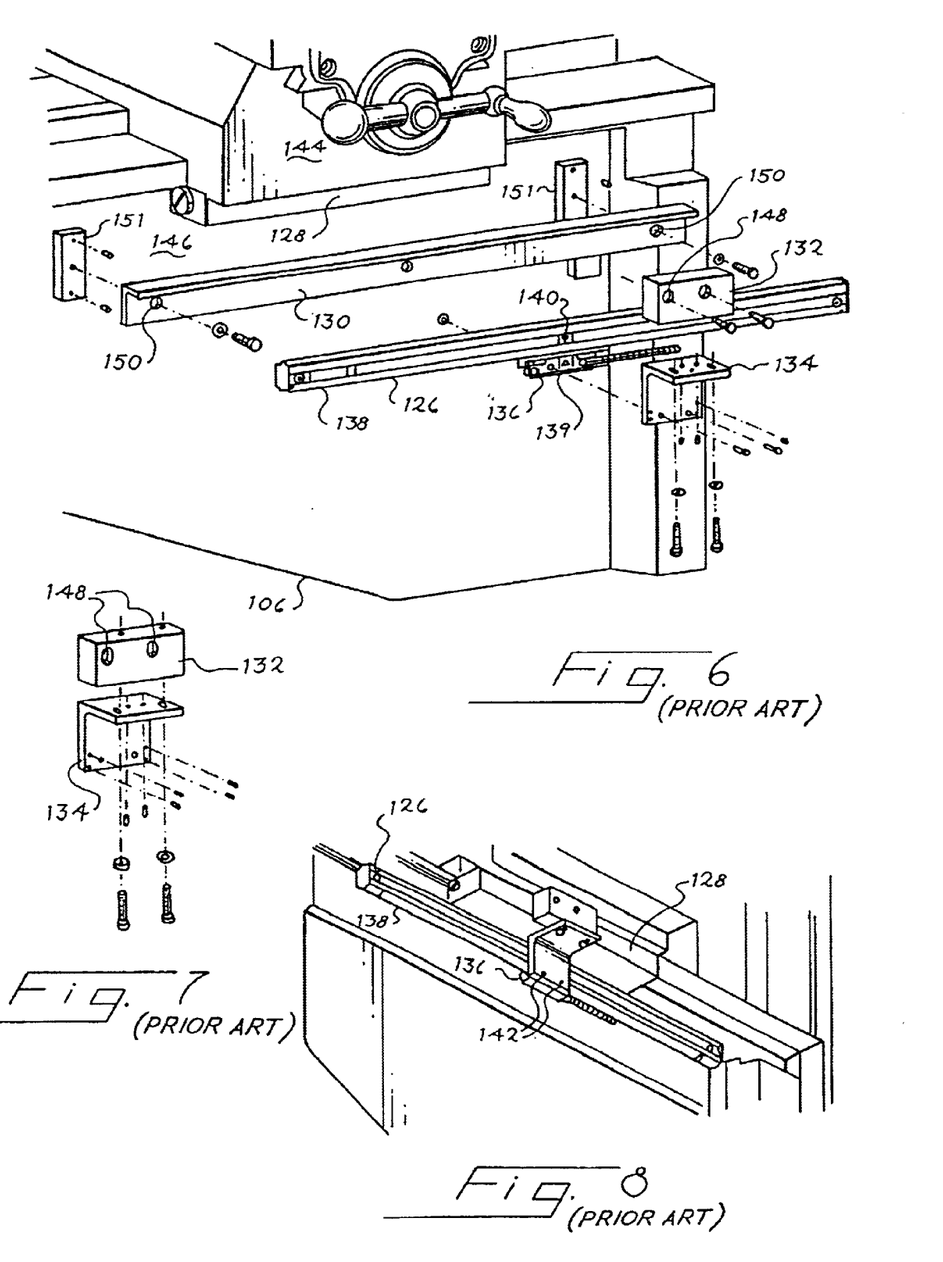
FIG. 6 shows an exploded view of a linear encoder attached to the lateral axis of a machine tool via a known process.
FIG. 7 shows an exploded view of a bracket and mounting block being attached to one another in accordance with the known process of FIG. 6.
FIG. 8 shows a perspective view of the mounting block of FIG. 7 attached to a reading head and being marked in accordance with the known process of FIG. 6.

The process for attaching a second linear encoder 126 to the cross-feed installation of the machine tool 106 is even more complicated than that discussed above for linear encoder 102. The end result of the process is for the linear encoder 126 to be attached to the knee 146 of the machine tool 106 via a spar 130 that is attached to the knee 146 via screws as shown in FIG. 6.

Figure 10:
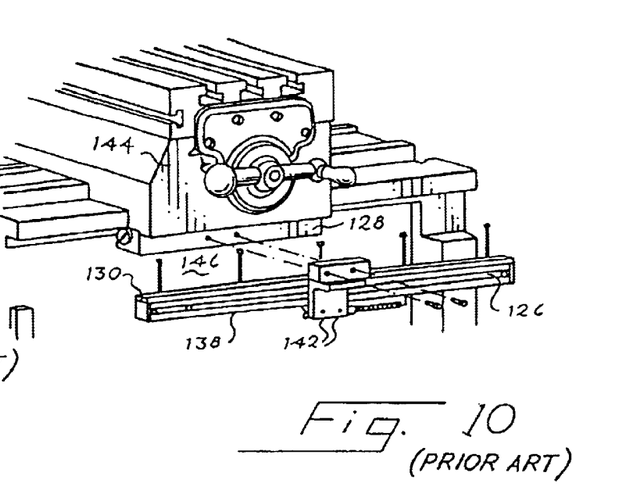
FIG. 10 shows a front perspective and exploded view of attaching the mounting block to the gib in accordance with the known process of FIG. 6.

The initial part of the attachment process involves moving the reading head 136 along the bottom portion of a scale case 138 that contains the linear encoder 126 until alignment marks 139 and 140 are aligned with one another. An L-shaped reading head bracket 134 with attached mounting block 132 is later attached to the reading head 136 via screws 142 as shown in FIGS. 8 and 10. Once the reading head bracket 134 is attached to the reading head 136, the saddle 144 and attached gib 128 are moved to their center of travel. At this position, the linear encoder 126 is centered against the knee 146 of the machine tool 106 and the mounting block 132 is positioned to the side of the gib 128. Next, both of the mounting holes 148 of the mounting block 132 are marked to the side of the gib 128 as shown in FIG. 8. After marking is complete, the linear encoder 126, mounting block 132 and reading head bracket 136 are removed so that holes are formed at the marked positions.

Figure 9:
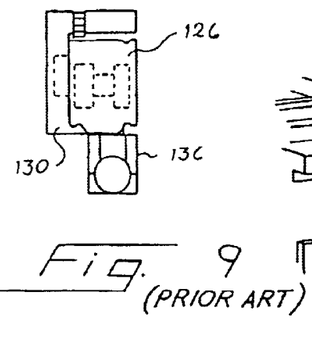
FIG. 9 shows a side cross-sectional view of a linear encoder being inserted into a spar in accordance with the known process of FIG. 6.

After the holes are formed, the linear encoder 126 is inserted into the spar 130 as shown in FIG. 9. The mounting block 132 is then attached to the gib 128 by inserting screws through the mounting holes 148 and the holes formed in the gib 128 as shown in FIG. 10. At this stage, a pair of lines is scribed on the knee 146 marking the top and end of the spar 130. The mounting block 132 and the linear encoder 126 are then removed from the saddle.

The spar 130 is then removed from the linear encoder 126 and positioned adjacent to the scribed lines on the knee 146. At this position, the mounting hole 150 nearest the scribed lines is marked to the knee 146. The spar 130 is removed and a hole is drilled at the marked location.

After the hole has been drilled, one end of the spar 130 is attached to the knee 146 by inserting a screw into both a mounting hole 150 and the drilled hole. The spar 130 is attached with a pair of leveling blocks 151 to the knee 146 via set screws. The spar 130 is then realigned and the other mounting hole 150 is marked. Again, the spar 130 is moved and a hole is drilled at the marked location. The spar 130 is realigned and a screw is inserted through the other mounting hole 150 and the recently drilled hole resulting in the attachment of the spar 130 to the knee 146.

Figure 11:
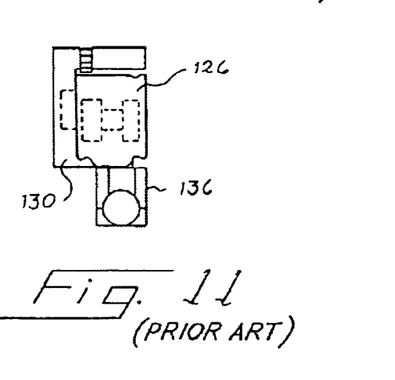
FIG. 11 shows a side cross-sectional view of a linear encoder being inserted into a spar in accordance with the known process of FIG. 6.

After the spar 130 is attached to the knee 146, the linear encoder 126, without mounting block 132 attached thereto, is inserted into the spar 130 and attached thereto via set screws as shown in FIG. 11. The mounting block 132, with reading head bracket 136 attached thereto, is then attached to the gib 128 via screws and is not attached to the linear encoder 126.

In each of the above-described processes, it is necessary to attach and remove the linear encoder and the linear encoder components a number of times to mark and form holes for attachment of the linear encoder. Accordingly, the process of attaching linear encoders to one or more of the machine axes can be a time consuming process.

Accordingly, an object of the present invention is to improve the mounting procedure for linear encoders that are used to retrofit one or more axes of a manually operated machine tool.

SUMMARY OF THE INVENTION

One aspect of the present invention regards a mounting tool that includes a base extending along a first direction that is parallel to a longitudinal dimension of the base and a height gage attached to the base. The height gage includes a first leg attached to the base and extending along a second direction that is not parallel to the first direction and a second leg attached to the first leg and comprising a support portion extending along a third direction that is not parallel to the second direction.

A second aspect of the present invention regards a method of mounting a position measuring device to a machine tool that includes positioning a template adjacent to the machine tool, wherein the template has a plurality of holes that correspond to mounting holes of a position measuring device and the template is distinct from the position measuring device. The method further includes forming holes in the machine tool based on positions of the plurality of holes, aligning the mounting holes of the position measuring device with the holes formed in the machine tool and attaching the position measuring device to the machine tool.

Each aspect of the present invention provides the advantage of improving the mounting procedure for measurement devices used to retrofit one or more axes of a manually operated machine tool.

Each aspect of the present invention provides the advantage of easily determining the required mounting holes for an linear encoder and/or a mounting spar.

Each aspect of the present invention provides the advantage of significantly reducing the time required for installing a linear encoder to a machine tool.

Each aspect of the present invention provides the advantage of being flexible in the type of linear encoder being mounted and the type of machine tool that is having the linear encoder attached thereto.

Each aspect of the present invention provides the advantage of allowing for a wide range of mounting requirements for the linear encoder.

Further advantages of the invention will become clear from the ensuing description of an exemplary embodiment in conjunction with the drawings.

DETAILED DESCRIPTION OF THE PREFERRED EMBODIMENTS OF THE INVENTION

Figure 12:
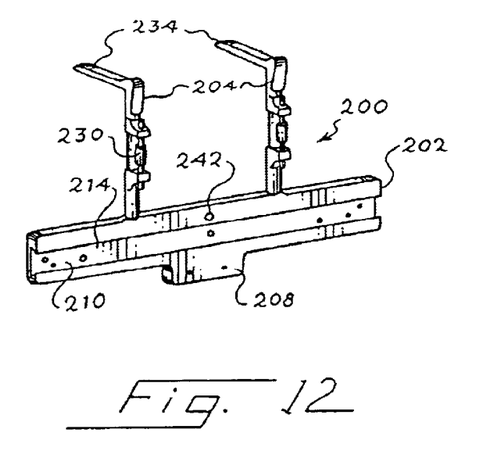
FIG. 12 shows a top perspective view of an embodiment of a mounting tool in accordance with the present invention.
Figure 13:
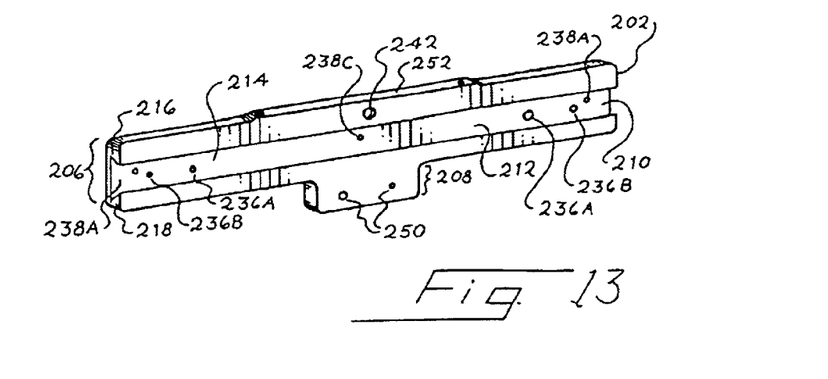
FIG. 13 shows a front perspective view of an embodiment of a base to be used with the mounting tool of FIG. 12.

FIG. 12 schematically shows a mounting tool 200 that includes a template in the form of base 202 and a pair of identical height gages 204 attached thereto. As shown in FIG. 13, the base 202 has a T-like shape with a longitudinal body 206 having a length of approximately 11¾", a height of approximately 2¼" and a thickness of approximately ⅜". A lower portion 208 is centrally located with respect to the longitudinal body 206 and has a length of approximately 2¼". The longitudinal body 206 and the lower portion 208 are preferably integral with one another and made of Aluminum.

As shown in FIG. 13, a slot 210 is formed in the body 206 so as to extend along the entire length of the body 206 in a direction x that is parallel to a longitudinal dimension of the base 202. The slot 210 forms an opening 212 extending along the same direction that the slot 210 extends. The opening 212 faces a planar portion 214 of the base 202. Besides the planar portion 214, the slot 210 is formed from a pair of side walls 216 and 218 that extend inward at an angle of 30° with respect to the planar portion 214. Thus, the slot 210 and opening 212 in combination define a volume of space that has a trapezoidal cross-section when viewed from a plane perpendicular to the direction x. The trapezoidal cross-section has base lengths ⅞" and 0.586" and a pair of legs having a length of ¼".

Figure 14:
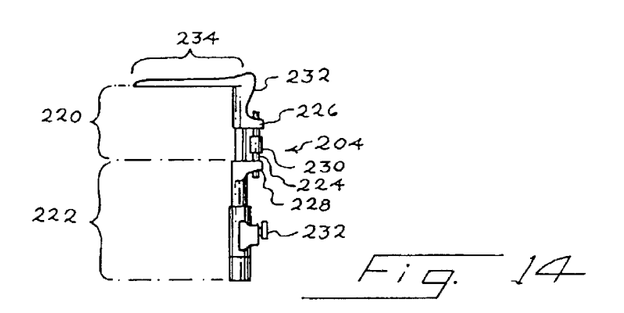
FIG. 14 shows a side view of an embodiment of a height gage to be used with the mounting tool of FIG. 12.

As shown in FIG. 14, each of the height gages 204 is composed of an upper leg 220 and a lower leg 222. The upper leg 220 is telescopically received within an opening formed in the lower leg 222. Note that it is also possible to have the lower leg 222 telescopically received within an opening in fit, the upper leg 220. The upper leg 220 and the lower leg 222 are coupled to each other via a threaded cylinder 224 that threadedly engages threaded openings formed in protrusions 226 and 228 of the upper leg 220 and lower leg 222, respectively. A fine adjustment wheel 230 is threaded onto the threaded cylinder 224. The fine adjustment wheel 230 is coupled to the upper and lower legs 220 and 222 in that rotation of the adjustment wheel 230 causes the cylinder 224 to rotate which causes the upper leg 220 to approach or move away from the lower leg 222. Thus, rotation of the adjustment wheel 230 adjusts the length of the height gage 204.

As shown in FIG. 14, the lower leg 222 has a stem 232 with a threaded opening that lies on top of the base 202. The threaded opening is aligned with a corresponding opening (not shown) formed in the top of the base. A screw is then threaded into the aligned openings resulting in the attachment of the height gage 204 to the base 202. When attached to the base 202, the lower leg 222 extends upward in a vertical direction that is perpendicular to the direction x. Consequently, a portion 232 of the upper leg 220 also extends vertically upward when the lower leg 222 is attached to the base 202.

As shown in FIGS. 12 and 14, the upper leg 220 has an L-like shape in that is has a support portion 234 that is integrally attached to the vertical portion 232 of the upper leg 220. When the height gage 204 is attached to the base 202, the support portion 234 extends along a horizontal direction that is substantially perpendicular to both the x-direction and the vertical direction. The support portion 234 is preferably made with a magnetic insert.

As will be explained below, the mounting tool 200 shown in FIG. 12 can be used to aid mounting a position measuring device, such as a linear encoder, for all linear encoder and spar lengths. In this scenario, a template in the form of base 202 includes a first set of holes 236 formed in the planar portion 214 that have an orientation with respect to each other that corresponds to the orientation and the spacing of mounting holes of the position measuring device, such as a linear encoder. The inner holes 236A are an equal distance from the center holes 238C. The outer holes 236B are separated from inner holes 236A by a distance of 1". Thus, holes 236A and 238C are used to mark the mounting holes for a linear encoder of a minimum length. Holes 236B and 238C are used to mark mounting holes for a linear encoder having a separation distance between its outer mounting holes length that is 2" inches greater than that of the linear encoder with the minimum length. The 2" value represents the incremental difference in length between the separation distances of the mounting holes of linear encoders of consecutive sizes. In those cases where the position measuring device is inserted into a spar, the base 202 also includes a second set of holes 238 that have an orientation with respect to each other that corresponds to the orientation and the spacing of the mounting holes of the spar. The outer holes 238A are an equal distance, such as 5", from the center hole 238C. Note that markings or indicia may be placed adjacent the holes 236 and 238 so that a user may readily identify which of the holes correspond with particular linear encoder or spar mounting holes.

Figure 15:
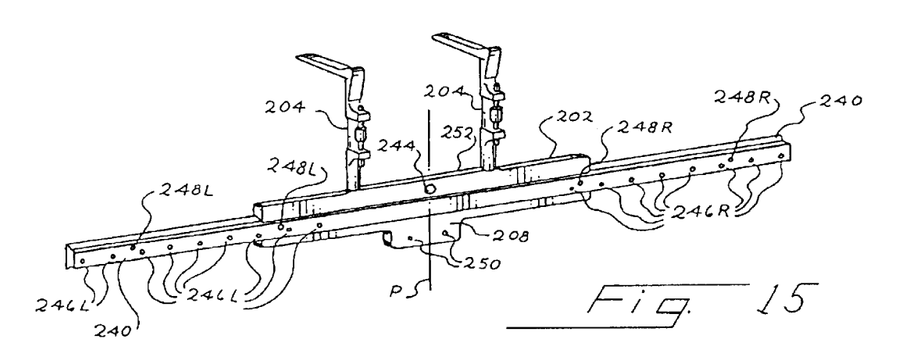
FIG. 15 shows a top, left front perspective view of a second embodiment of a mounting tool in accordance with the present invention.
Figure 16:
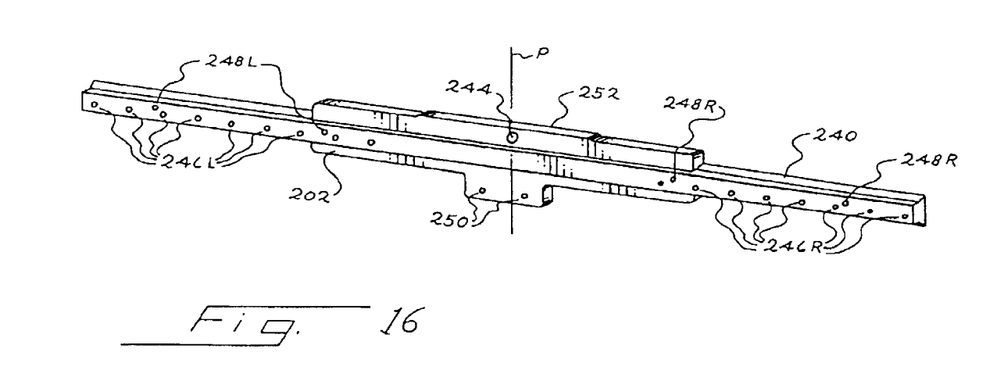
FIG. 16 shows a top, right front perspective view of the mounting tool of FIG. 15 with the height gages removed.

In those cases where the position measuring device, such as a linear encoder, has a length that is greater than the length of the longitudinal body 206, the template is modified to include an extension guide 240 that is used to aid in the mounting of the position measuring device without requiring the axis to be moved. As shown in FIGS. 15 and 16, the extension guide 240 has a cross-section that substantially corresponds to the trapezoidal cross-section of the slot 210. The extension guide 240 has a length that is preferably 24", which is greater than the length of the body 206. Note that the extension guide 240 may have other lengths, such as 18", 30" and 36".

As shown in FIGS. 15 and 16, the extension guide 240 is inserted into the slot 210 and positioned so that its central opening (not shown) is aligned with a central opening 242 formed in the base 202. Next, a locking pin 244 is inserted into the aligned central openings and attaches the extension guide 240 to the body 202.

As shown in FIGS. 15 and 16, the extension guide 240 includes lower holes 246 and upper holes 248. The holes 246L and 248L located to the left of a plane P that is a perpendicular bisector of the extension guide 240 are mirror images of the holes 246R and 248R located to the right of the plane P. The first set of lower holes 246 that have an orientation with respect to each other that corresponds to the orientation and spacing of mounting holes of the position measuring device, such as a linear encoder. Adjacent ones of the holes 246L and 246R are separated from one another by a constant distance, such as 1". In those cases where the position measuring device is inserted into a spar, the extension guide 240 also includes a second set of upper holes 248 that have an orientation with respect to each other that corresponds to the orientation and spacing of mounting holes of spars that can be used in conjunction with the linear encoder. Adjacent ones of the holes 248L and 248R are separated from one another by a constant distance, such as 5". Note that in the case of the central opening and the holes 246 and 248, they each have a longitudinal axis that extends perpendicular to the longitudinal direction of the extension guide 240. In addition, markings or indicia may be placed adjacent the holes 246 and 248 so that a user may readily identify which of the holes correspond with particular linear encoder or spar mounting holes.

With the above description of the mounting tool 200 in mind, the processes of mounting a position measuring device, such as a linear encoder, according to the present invention are described hereinafter. In particular, the reading head bracket, like the reading head bracket 116 of FIG. 3, is attached to a position measuring device, such as the linear encoder 102 of FIG. 1, via screws so as to form a linear encoder assembly. Note that if a spar, like the spar 130 of FIG. 6, is to be used, then it is attached to the linear encoder and, thus, forms part of the linear encoder assembly.

The linear encoder assembly is then positioned at a general location on the machine tool where the reading head, such as the reading head 108 of FIG. 2, is to be located. At the general location, the reading head bracket is positioned against the machine tool and the mounting holes of the reading head bracket are marked on the machine tool axis.

At this stage, holes are drilled at the markings made on the machine tool axis. Next, the reading head bracket is removed from the linear encoder and is attached to the machine axis by inserting screws into the mounting holes of the reading head bracket and the holes drilled in the machine tool axis.

The mounting tool 200 is then attached to reading head bracket with the reading head mounting screws. In the case shown in FIG. 17 of an x-axis installation of the linear encoder, attachment is accomplished by positioning the support portions 234 of the height gages 204 to magnetically engage and be supported upon one or more surfaces of the machine tool so that the lower portion 208 of the body 206 is positioned adjacent to the reading head bracket. Next, the adjustment wheels 230 are rotated so that the attachment holes 250 of the lower portion 208 are aligned with mounting holes of the reading head bracket. At this point, screws are inserted into the aligned holes so as to attach the base 202 to the reading head bracket. After attachment, the adjustment wheels are further rotated so that the reading head mounting bracket and the slot 210 are aligned to the axis of travel of the machine tool using common measurement devices such as depth micrometers or dial indicators. Once the reading head mounting bracket and the slot 210 are aligned to the axis of travel, the reading head mounting bracket is secured to the machine.

A variation of the above alignment process can be performed by the base 202 alone without the height gages being attached thereto. This alternative alignment process is performed for the y-axis installation of the linear encoder. In this scenario shown in FIG. 18, the machine tool does not have surfaces that allow for the support portions 234 to support the base 202 in a stable manner. For example, many grinders do not have flat surfaces to allow the height gages to be hung therefrom. Accordingly, there are situations where it is necessary to manually position the base 202 so as to align the mounting holes 250 with the mounting holes of the reading head bracket that is aligned to the machine axis travel. The base 202 and reading head bracket are then attached with screws as described previously. Next, the reading head bracket and the slot 210 are aligned with the axis of travel of the machine tool by aligning the top planar surface 252 of the base 202 with the axis of travel by using common measurement devices such as depth micrometers or dial indicators.

Figure 17:
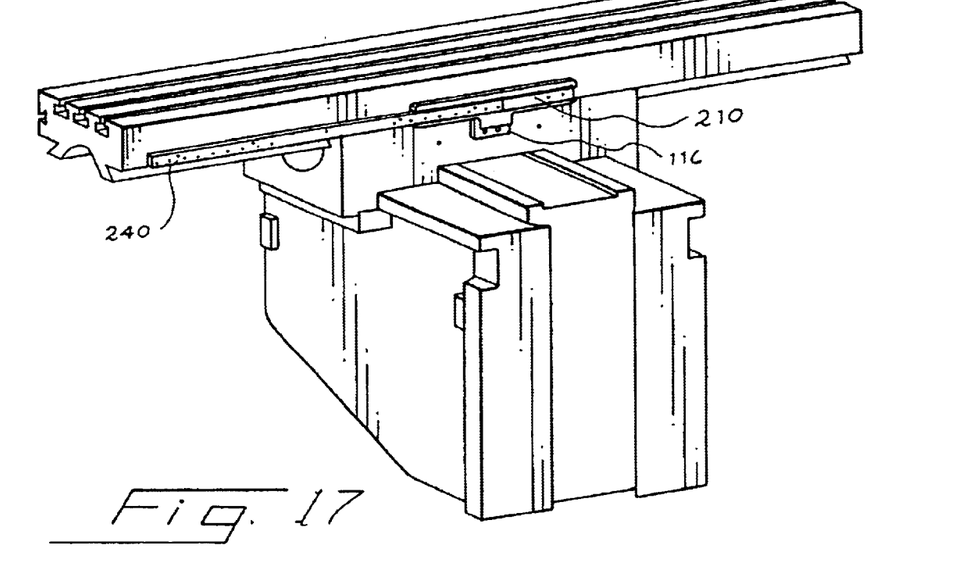
FIG. 17 shows a perspective view of the mounting tool of FIG. 15 when attached to a machine tool and with the height gages removed.
Figure 18:
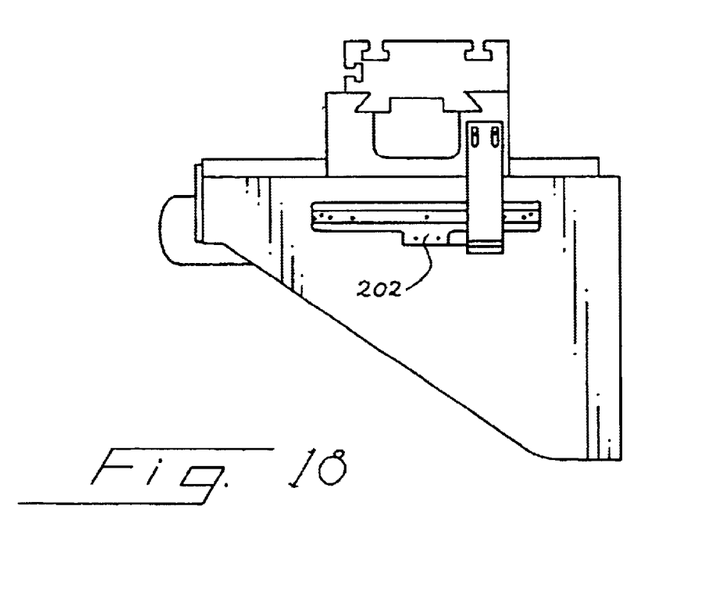
FIG. 18 shows a front view of the mounting tool of FIG. 12 when attached to a machine tool and with the height gages removed.

Note that each of the above alignment processes can be performed either with an extension guide 240 attached to the base 202 in the manner shown in FIG. 17 or with no extension guide 240 in the manner shown in FIG. 18. In the case when no extension guide 240 is attached to the base 202 there are two possible situations. First, if the linear encoder or spar has a length that is less than the length of the longitudinal body 206 of the base 202, then the center hole 238C is positioned at the center of travel and marked on the machine tool and the appropriate mounting holes 236 or 238 formed in the base 202 for the linear encoder or spar to be attached are marked onto the machine tool. The base 202 is removed and the marked positions are transfer punched.

Regarding the second situation where no extension guide 240 is attached to the base, if the linear encoder or spar has a length that is greater than the length of the longitudinal body 206, then the center hole 238C of the base 202 is positioned at the center of travel and is marked. The base 202 is removed and the marked position is transfer punched. Next, the machine is moved in one direction in n number of 1" increments to find one of the mounting locations for a linear encoder that is the nth linear encoder longer than the linear encoder represented by the holes 236B. For example, if it is desired to mount a linear encoder that has mounting holes that are separated from one another by a distance that is 4" greater than the separation distance between holes 236B, then the machine is moved 2" to the right of the punched position and the hole 238C of the base 202 is aligned with the punched position that moved with the machine. Next, the hole 236B to the right of hole 238C is marked. The base 202 is removed and the marked position is transfer punched. Next, the machine is moved to the left so as to end up 2" to the left of the punched position of the center of travel. The hole 236B to the left of hole 238C is marked. The base 202 is removed and the mark position is transfer punched. Holes are then drilled at the three punched positions and mounting holes of the linear encoder are aligned with the drilled holes so that the linear encoder can be attached via screws inserted into the aligned holes.

Attachment of longer spars is done in a similar manner after the center of travel position has been marked and punched. For example, if it is desired to mount a spar that has a length that is 10" longer than the linear encoder mounted by holes 238A, then the machine is moved 5" to the right of the punched position and the hole 238A of the base 202 is aligned with the punched position that moved with the machine. Next, the hole 238A to the right of hole 238C is marked. The base 202 is removed and the marked position is transfer punched. Next, the machine is moved to the left so as to end 5" to the left of the punched position of the center of travel. The hole 236B to the left of hole 238A is marked. The base 202 is removed and the mark position is transfer punched. Holes are then drilled at the three punched positions and mounting holes of the spar are aligned with the drilled holes so that the spar can be attached via screws inserted into the aligned holes.

In the case of using an extension guide 240 as shown in FIG. 17, the particular holes formed in the extension guide 240 for mounting a particular linear encoder are identified after the attachment of the reading head bracket to the base 202. The positions of the identified holes are marked via transfer punching through the holes onto the machine tool. Note that in contrast with the situation where no extension guide 240 is used, the table of the machine tool may not be required to be moved during the marking process if the linear encoder or spar to be attached has a length that is less than the length of the extension. In the case where the linear encoder or spar has a length that is greater than that of the extension, then a marking process where the machine is moved can be used that is similar to that described above with respect to the case where the base 202 is alone used for marking.

After marking is performed, with or without using an extension, the base 202 is detached from the reading head bracket so that the reading head bracket remains attached to the machine tool. Holes are then drilled in the marked areas. The linear encoder or spar are attached to the machine tool by aligning their mounting holes with the drilled holes formed in the machine tool and inserting screws into the aligned holes. In the case of attaching the spar, the linear encoder is then inserted into the spar.

The next step in the process is to attach the reading head to the reading head bracket via screws. Thus, the assembly of the measuring system, the linear encoder and the reading head, is complete.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A method of mounting a position measuring device to a machine tool, comprising:

attaching a reading head bracket to said machine tool;

positioning a template adjacent to said machine tool, wherein said template comprises a plurality of holes that correspond to all necessary mounting holes of a position measuring device and said template is distinct from said position measuring device;

attaching said template to said reading head bracket;

marking all said necessary mounting holes on said machine tool through said plurality of holes of said template;

detaching said template from said reading head bracket;

forming holes in said machine tool based on positions of said plurality of holes;

aligning said mounting holes of said position measuring device with said holes formed in said machine tool; and attaching said position measuring device to said machine tool.

2. The method of claim 1, wherein said position measuring device comprises a linear encoder.

3. The method of claim 1, wherein said attaching said position measuring device comprises inserting screws into said aligned mounting holes of said position measuring device and said holes formed in said machine tool.

4. The method of claim 1, wherein said template is not a linear encoder.

5. The method of claim 1, wherein said machine tool does not move along an axis of travel from the time of positioning to said time of attaching said position measuring device.

6. The method of claim 1, wherein said template is supported on said machine tool during said positioning.

7. The method of claim 1, wherein said attaching of said position measuring device to said machine tool comprises:

attaching said position measuring device by inserting screws in said holes in said machine tool; and attaching said reading head to said reading head bracket.

8. The method from claim 1, wherein said attaching said template to said reading head bracket comprises aligning said template with respect to said reading head bracket.

9. The method from claim 8, wherein said attaching said template to said reading head bracket further comprises aligning said template with respect to the axis of travel.

10. A method of mounting a position measuring device to a machine tool, comprising:

attaching a reading head bracket to said machine tool;

positioning a template adjacent to said machine tool, wherein said template comprises a plurality of holes that correspond to all necessary mounting holes of a spar that is to support a position measuring device and said template is distinct from said position measuring device;

attaching said template to said reading head bracket;

marking all said necessary mounting holes on said machine tool through said plurality of holes of said template;

detaching said template from said reading head bracket;

forming holes in said machine tool based on positions of said plurality of holes;

aligning said mounting holes of said spar with said holes formed in said machine tool;

attaching said spar to said machine tool; and attaching said position measuring device to said spar.

11. The method of claim 10, wherein said position measuring device comprises a linear encoder.

12. The method of claim 10, wherein said attaching of said spar comprises inserting screws into said aligned mounting holes of said position measuring device and holes formed in said machine tool.

13. The method of claim 10, wherein said template is not a linear encoder.

14. The method of claim 10, wherein said machine tool does not move along an axis of travel from the time of positioning to said time of attaching said spar.

15. The method of claim 10, wherein said template is supported on said machine tool during said positioning.

16. The method from claim 10, wherein said attaching of said spar to said machine tool comprises attaching said position measuring device by inserting screws in said holes in said machine tool.

17. The method from claim 10, wherein said attaching of said position measuring device to said spar comprises inserting said position measuring device into said spar.

18. The method from claim 10, wherein said attaching said template to said reading head bracket comprises aligning said template with respect to said reading head bracket.

19. The method from claim 18, wherein said attaching said template to said reading head bracket further comprises aligning said template with respect to the axis of travel.

* * * * *